US010358537B2

(12) United States Patent
Lesser et al.

(10) Patent No.: US 10,358,537 B2
(45) Date of Patent: Jul. 23, 2019

(54) POLYMERIC SOLUTIONS, METHODS OF MANUFACTURE THEREOF AND ARTICLES MANUFACTURED THEREFROM

(71) Applicant: THE UNIVERSITY OF MASSACHUSETTS, Boston, MA (US)

(72) Inventors: Alan J. Lesser, Sunderland, MA (US); Gregory Connor Evans, Sunderland, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 148 days.

(21) Appl. No.: 14/879,609

(22) Filed: Oct. 9, 2015

(65) Prior Publication Data

US 2016/0185930 A1 Jun. 30, 2016

Related U.S. Application Data

(60) Provisional application No. 62/083,984, filed on Nov. 25, 2014.

(51) Int. Cl.
*C08J 9/14* (2006.01)
*C08J 9/00* (2006.01)
*C08K 5/00* (2006.01)
*C08K 5/05* (2006.01)
*C08J 9/12* (2006.01)

(52) U.S. Cl.
CPC ............. *C08J 9/142* (2013.01); *C08J 9/0023* (2013.01); *C08K 5/0016* (2013.01); *C08K 5/05* (2013.01); *C08J 9/0066* (2013.01); *C08J 9/122* (2013.01); *C08J 9/125* (2013.01); *C08J 2203/06* (2013.01); *C08J 2203/08* (2013.01); *C08J 2203/12* (2013.01); *C08J 2203/18* (2013.01); *C08J 2371/12* (2013.01); *C08J 2377/02* (2013.01); *C08J 2379/08* (2013.01); *C08J 2381/06* (2013.01)

(58) Field of Classification Search
CPC ........ C08J 9/0023; C08J 9/0066; C08J 9/122; C08J 9/125; C08J 9/142; C08J 2203/06; C08J 2203/08; C08J 2203/12; C08J 2203/18; C08J 2371/12; C08J 2377/02; C08J 2379/08; C08J 2381/06; C08K 5/0016; C08K 5/05
See application file for complete search history.

(56) References Cited

U.S. PATENT DOCUMENTS

| 5,017,622 | A | * | 5/1991 | Bland | C08J 9/0061 521/134 |
| 5,670,102 | A | * | 9/1997 | Perman | B29C 44/3453 264/50 |
| 9,309,369 | B1 | * | 4/2016 | Meador | C08J 9/283 |
| 2008/0085983 | A1 | * | 4/2008 | Ahn | B01J 13/14 528/5 |
| 2012/0061867 | A1 | * | 3/2012 | Dougherty, Jr. | B29C 44/3461 264/13 |
| 2012/0065282 | A1 | * | 3/2012 | Trouillet-Fonti | C08J 9/0061 521/59 |
| 2012/0112374 | A1 | * | 5/2012 | Ohtani | G03G 9/0804 264/9 |

OTHER PUBLICATIONS

Deshmukh et al., "Dissolution and Crystallization of Polyamides in Superheated Water and Concentrated Ionic Solutions"; American Chemical Society, Macromolecules, 2013, pp. 7086-7096.
Harings et al., Processing of Polyamides in the Presence of Water via Hydrophobic Hydration and Ionic Interactions, American Chemical Society, Macromolecules, 45, 2012, pp. 5789-5797.
Pitzer et al., "Critical phenomena and thermodynamics of dilute aqueous sodium chloride to 823 K", Proc. Nati. Acad. Sci. USA, vol. 81, Feb. 1984, pp. 1268-1271.
Pitzer, "Critical Point and Vapor Pressure of Ionic Fluids Including NaCl and KCl"; Chemical Physics Letters, vol. 105, No. 5, 30 Mar. 1984, 6 pages.
Vinken et al., "Role of Superheated Water in the Dissolution and Perturbation of Hydrogen Bonding in the Crystalline Lattice of Polyamide 4,6", Langmuir, 24, 2008, pp. 6313-6326.

* cited by examiner

*Primary Examiner* — John M Cooney
(74) *Attorney, Agent, or Firm* — Cantor Colburn LLP

(57) ABSTRACT

Disclosed herein is a composition comprising a polymer; and a superheated fluid; where at least a portion of the polymer and the superheated fluid co-exist in a single phase. Disclosed herein is a method comprising exposing a polymer to a superheated fluid; swelling at least a portion of the polymer with the superheated fluid so that the polymer and the superheated fluid co-exist in a single phase; and changing pressure or temperature within the single phase to change a property in the polymer.

13 Claims, 15 Drawing Sheets

Superheated water and PES

T=165 C
P=800 psi

POLYMERIC SOLUTIONS, METHODS OF MANUFACTURE THEREOF AND ARTICLES MANUFACTURED THEREFROM

CROSS REFERENCE TO RELATED APPLICATION

This US Non-Provisional application claims the benefit of U.S. Provisional Application Ser. No. 62/083,984, filed 25 Nov. 2014, the entire contents of which are hereby incorporated by reference.

BACKGROUND

This disclosure relates to polymeric solutions, methods of manufacture thereof and to articles manufactured therefrom. In particular, this disclosure relates to polymeric solutions that do not employ volatile organic solvents that are detrimental to the environment.

Many articles fabricated with polymeric materials use volatile organic compounds (VOCs) as part of their processing. The use of VOCs has proven to cause many environmental problems historically and their control has been continually regulated by the Environmental Protection Agency (EPA). Meeting current and future EPA regulations for fabrication of these articles continues to become increasingly costly for many industries. Consequently, new process media that are nontoxic and environmentally benign are desirable for new sustainable manufacturing processes.

SUMMARY

Disclosed herein is a composition comprising a polymer and a superheated fluid; where at least a portion of the polymer and the superheated fluid co-exist in a single phase.

Disclosed herein is a method comprising exposing a polymer to a superheated fluid swelling at least a portion of the polymer with the superheated fluid so that the polymer and the superheated fluid co-exist in a single phase; and changing pressure or temperature within the single phase to change a property in the polymer.

Disclosed herein too are articles manufactured from the aforementioned composition and using the aforementioned method.

BRIEF DETAILS OF THE FIGURES

Figure 11:
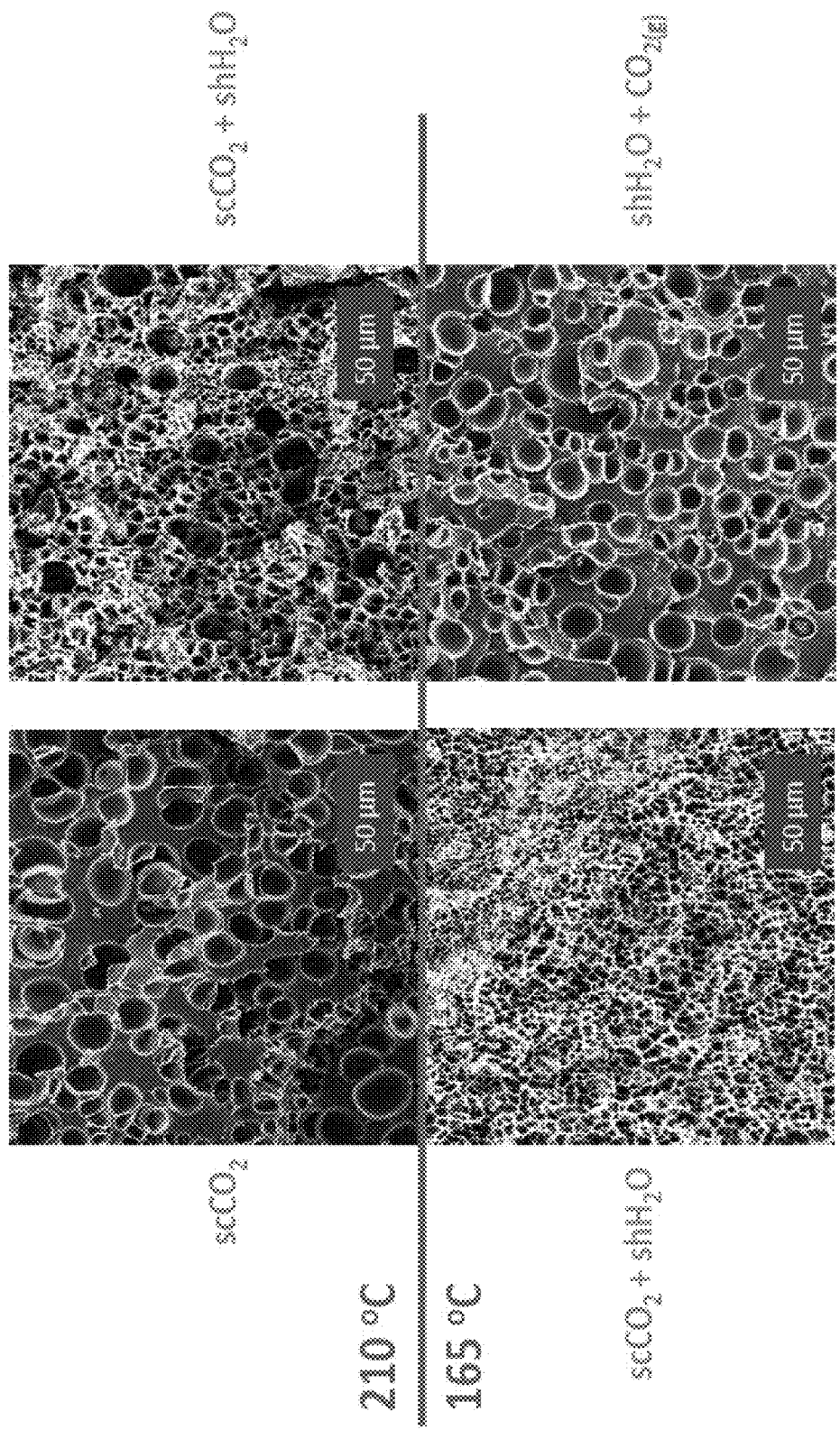
Figure 12:
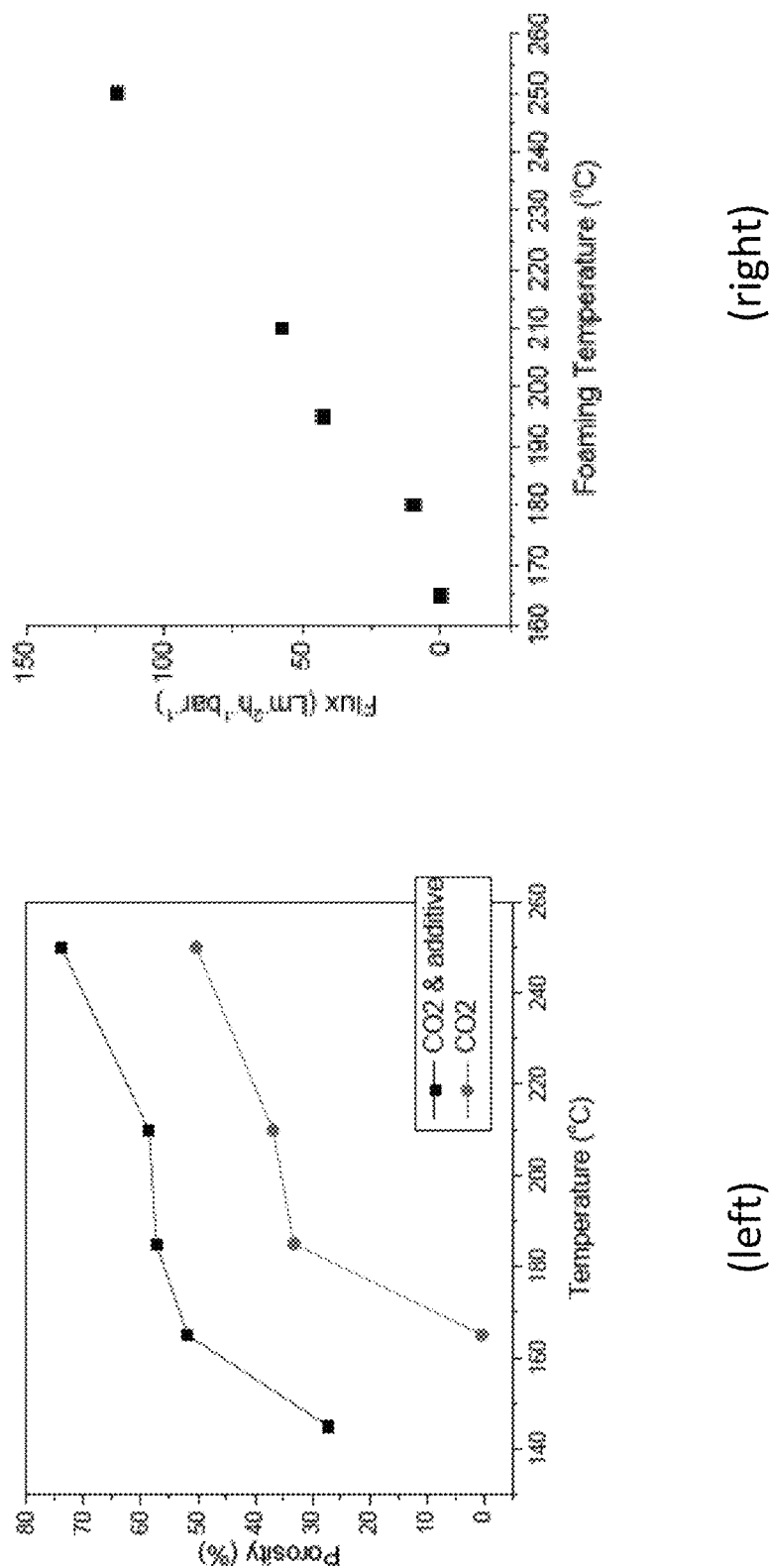
Figure 13:
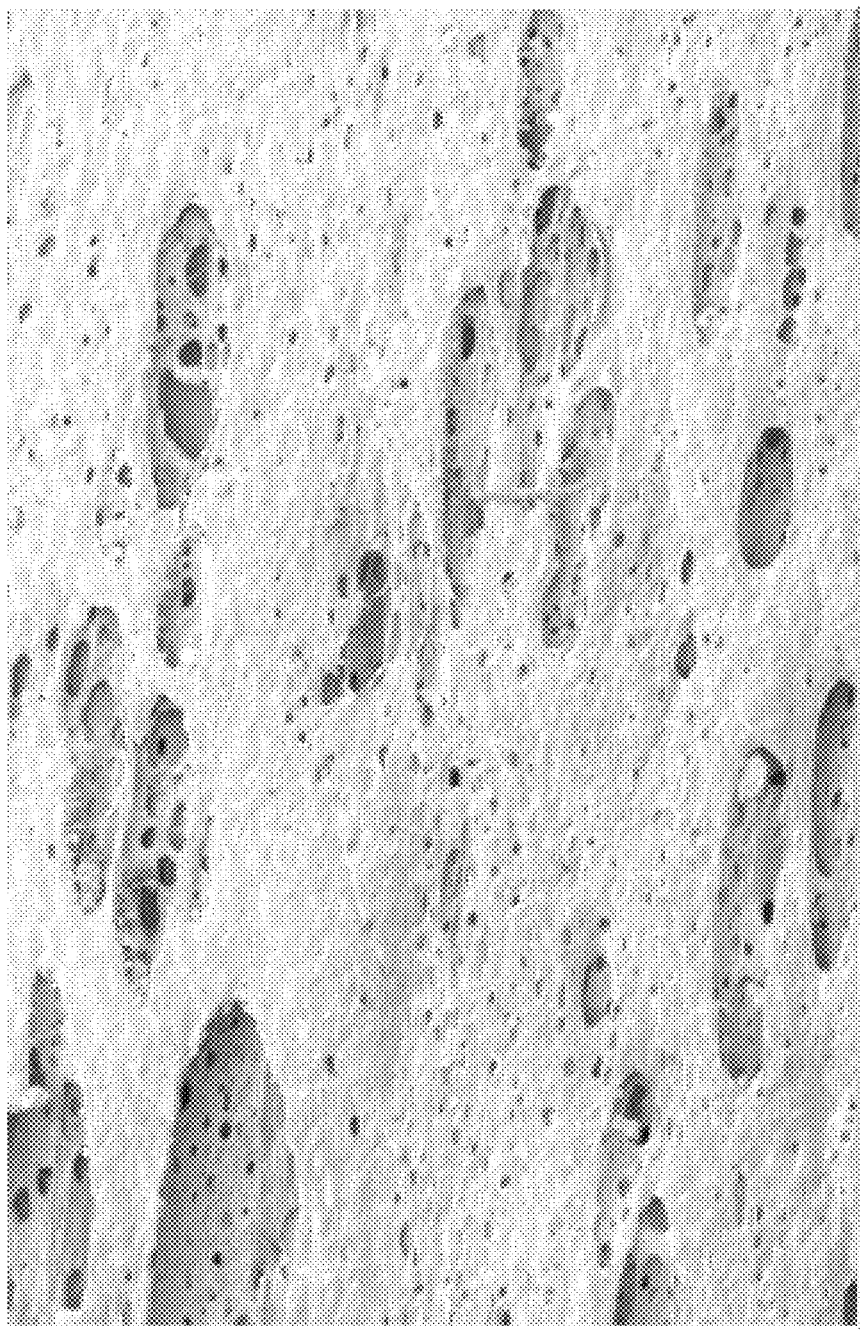

FIG. 11 shows a comparison of photomicrographs of polyethersulfone foams produced under different conditions. The conditions are as follows: upper left photomicrograph–supercritical carbon dioxide alone, saturation pressure 4000 psi, and foam temperature=210° C.; upper right photomicrograph–supercritical carbon dioxide alone (saturation pressure 4000 psi, and foam temperature=210° C.)+superheated water (40 wt % $H_2O$/PES); lower left photomicrograph–supercritical carbon dioxide alone (saturation pressure 4000 psi, and foam temperature=165° C.)+superheated water (40 wt % $H_2O$/PES); and lower right photomicrograph–carbon dioxide gas (saturation pressure 800 psi, and foam temperature=165° C.)+superheated water (40 wt % $H_2O$/PES);

FIG. 12 shows two graphs—one on the left that shows porosity in foams produced over a wide range of temperatures while the one on the right shows that the foams produced in superheated water combined with supercritical carbon dioxide to produce open cell foams with measurable permeability;

FIG. 13 is a photomicrograph of a polyethersulfone containing 10 wt % calcium stearate foam generated in superheated water.

Figure 14:
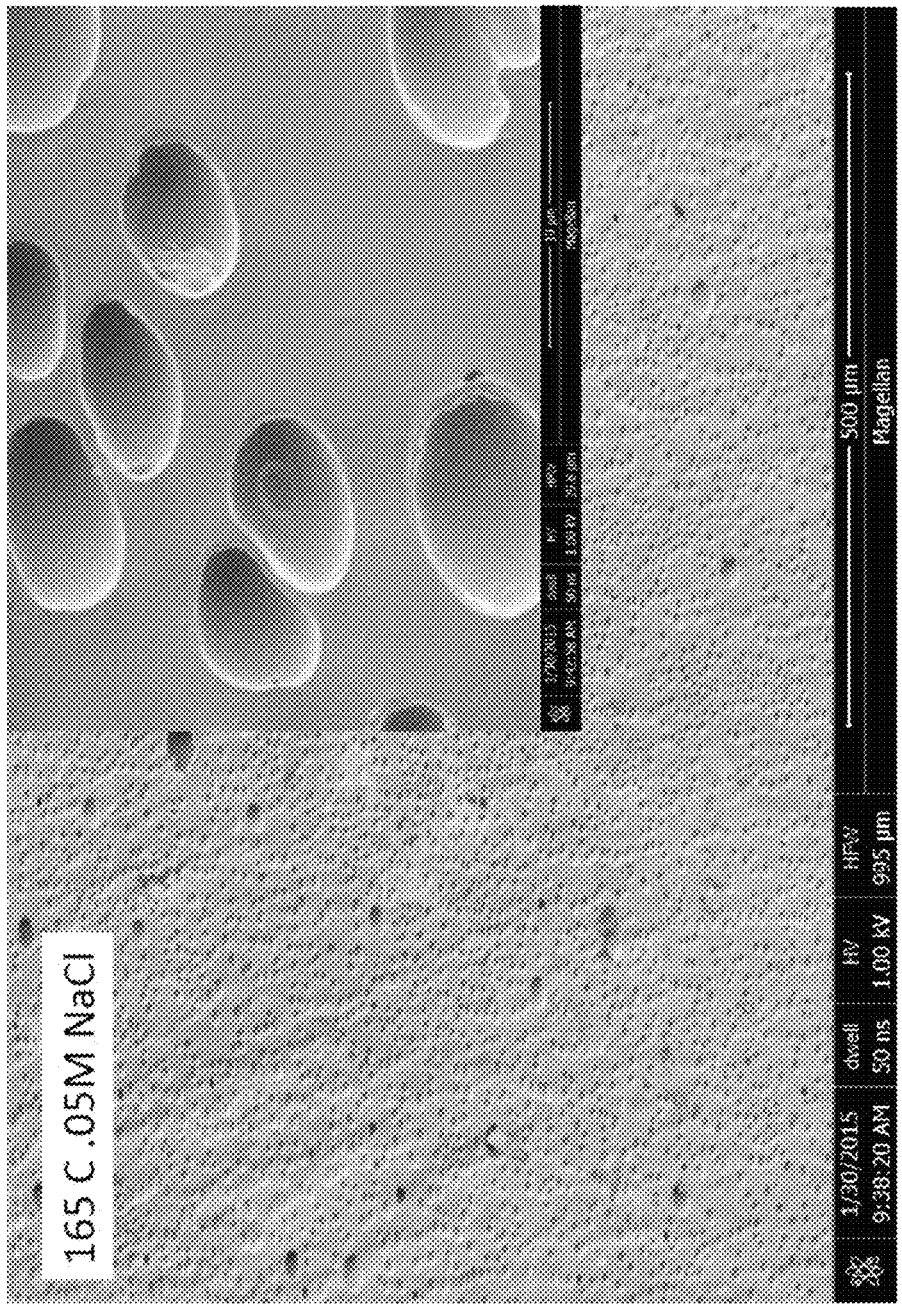
Figure 15:
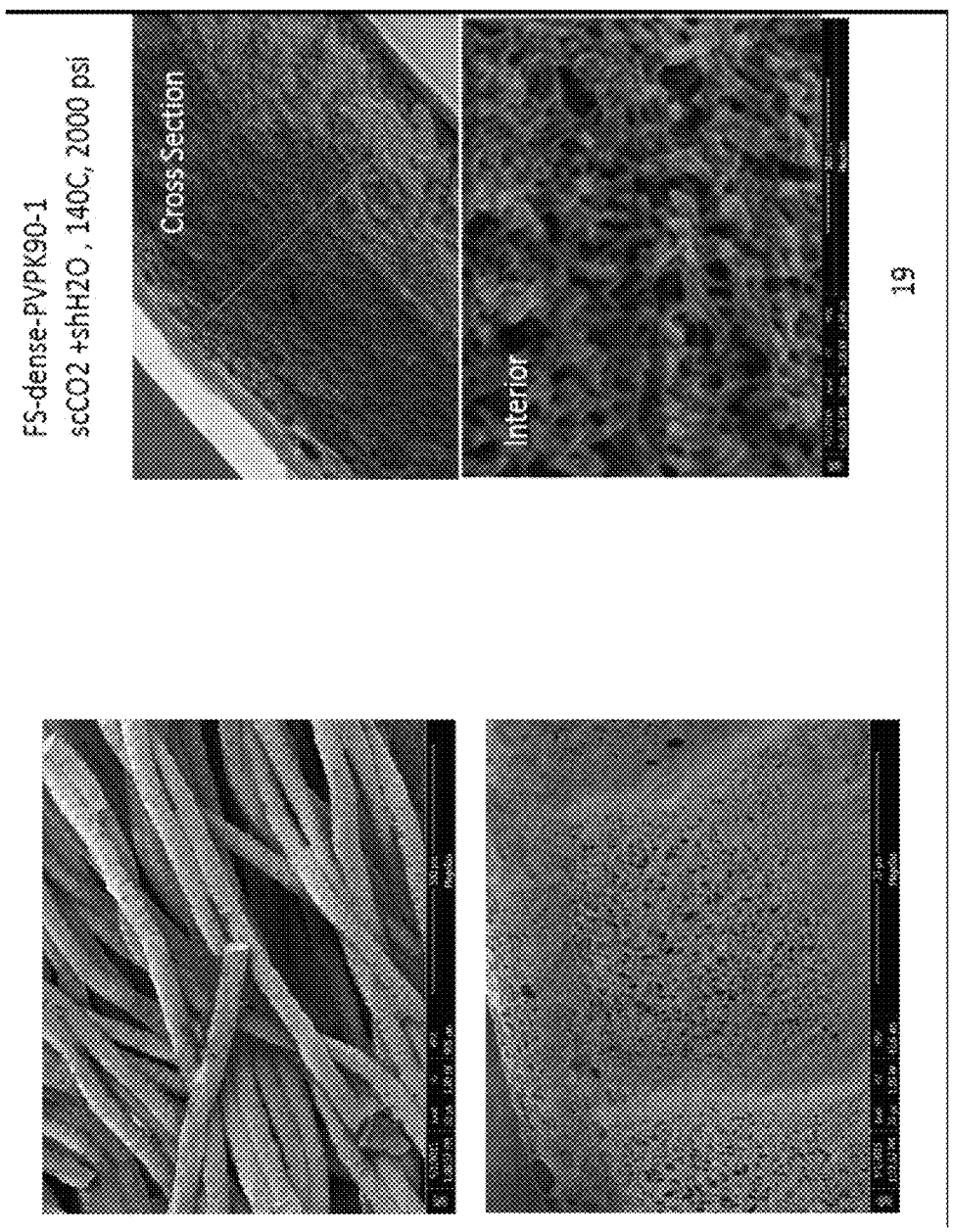

FIG. 14 is a photomicrograph of a polyethersulfone foam to which was added a sodium chloride additive; and FIG. 15 depicts a series of photomicrographs where the images in the upper and lower left are polyamide6 fibers foamed in superheated water and supercritical carbon dioxide while the photomicrographs on the right are of a polyethersulfone film that has been foamed.

DETAILED DESCRIPTION

Disclosed herein is a method of using superheated fluids or a combination of superheated and supercritical fluids to swell a polymer and to then subject the swollen polymer to further processing. In one embodiment, the swollen polymer is subjected to a decrease in pressure and temperature to produce polymeric foams and/or porous materials. Additives that effect the swelling of the polymer or the solubility of the polymer in the fluids may be added to mixture of the superheated fluid and the polymer or to the combination of superheated and supercritical fluids and the polymer. The use of superheated fluids or a combination of superheated and supercritical fluids is advantageous in that the fluids used to swell the polymer are not environmentally hazardous. Further, these non-volatile organic fluids and the polymers processed in them may be recycled for reuse without any detrimental environmental effects.

In one embodiment, a single superheated fluid (i.e., a first superheated fluid) may be used to treat the polymer, while in another embodiment a combination of superheated fluids (i.e. a first superheated fluid, a second superheated fluid, a third superheated fluid, and so on) may be used to treat the polymer. When the polymer is treated with a combination of superheated fluids that are miscible under the treatment conditions, it may be treated simultaneously with the combination of fluids or alternatively, it may be treated sequentially with the superheated fluids.

The introduction of superheated fluids in a polymer can depress its melting point and allow for processing (flow) of the polymer. This can happen with homopolymers (listed below) well as copolymers, polymer alloys and blends, and polymer-based composites. In another embodiment, other additives can be used to interact with the polymer and the superheated fluid to enhance the processability of the polymer. This may include the use of surfactant molecules in the case of water or other aqueous or polar superheated fluids or ionic compounds to alter ionic or dielectric characteristics of the polymer, thereby enhancing its processability.

In another embodiment, additives that reduce, eliminate, or otherwise mitigate polymer degradation during processing may be introduced in combination with the polymer and superheated liquid to produce articles. The additives can also be added to change the foam properties and the structure as desired.

When a polymer is treated with a combination of superheated and supercritical fluids, it may be treated with both fluids in combination or it may be treated with these fluids sequentially. When certain polymers are treated with both a superheated fluid and a supercritical fluid simultaneously, the polymers have been observed to show some special characteristics that are not observed when the polymer is treated with each of the fluids sequentially. This indicates that a combination of a supercritical fluid and a superheated fluid acts synergistically to produce improved features that are not available when treated with the same combination sequentially. This is unexpected.

In an embodiment, when volatile organic fluids (that are not regarded as being environmentally friendly) have to be used to process a polymer, the amount of such a component used may be substantially reduced when compared with its use as a non-superheated fluid.

The superheated fluids can be polar fluids (e.g., water, alcohols, and the like) or non-polar fluids (e.g., alkanes, cycloalkanes, and the like). Examples of fluids that may be superheated for swelling or solvating the polymer includes fluids such as water, methanol, ethanol, propanol, glycol ethers, methane, propane, ethane, or the like, or a combination thereof. The supercritical fluids include nitrogen, carbon dioxide, alkanes such as methane, propane, ethane, nitrogen, nitrous oxide, or the like, or a combination thereof. Exemplary superheated fluids are water and ethanol, while exemplary supercritical fluids are carbon dioxide and nitrogen.

Polymers that can be treated by superheated fluids or a combination of superheated and supercritical fluids can be polar or non-polar organic polymers. Examples of suitable organic polymers are thermoplastic polymers, thermosetting polymers, blends of thermoplastic polymers, blends of thermosetting polymers, and blends of thermoplastic polymers with thermosetting polymers. The organic polymer can be a homopolymer, a copolymer, a block copolymer, an alternating copolymer, an alternating block copolymer, a random copolymer, a random block copolymer, a graft copolymer, a star block copolymer, an ionomer, a dendrimer, or a combination comprising at least one of the foregoing polymers. An exemplary polymer for the treatment with a superheated fluid or a combination of superheated and supercritical fluids is a thermoplastic polymer.

Examples of thermoplastic polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, polysiloxanes, or the like, or a combination comprising at least one of the foregoing organic polymers.

Examples of thermosetting polymers include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination comprising at least one of the foregoing thermosetting polymers.

The additives that can added to the mixture to vary foam properties and performance can include crystalline materials or amorphous material that are soluble in either the superheated fluid, the supercritical fluid or a carrier fluid that is used to suspend or solubilize the polymer. Crystalline or semi-crystalline materials are preferred. Examples of additives are sugars, salts (e.g., acidic, basic or neutral salts), solvents, gases, or combinations thereof. The additives are added to the mixture of the polymer and the respective fluids and admitted to the pressurization device or a mixing device. It is desirable for the additives to be soluble in the superheated fluid and/or the supercritical fluid. The additives may or may not dissolve into the polymer during processing. The additives may precipitate during the foaming process to produce a different morphology in the foam. In an embodiment, the precipitated particles may be extracted from the porous polymer foam by using a solvent that preferentially dissolves the additive after the foam is manufactured.

The salts may be inorganic salts or salts that include organic and inorganic ions. Common salt-forming cations include ammonium ($NH_4^+$), calcium ($Ca_2^+$), iron ($Fe_2^+$ and $Fe_3^+$), magnesium ($Mg_2^+$), potassium ($K^+$), pyridinium ($C_5H_5NH^+$), quaternary ammonium ($NR_4^+$), and sodium ($Na^+$). The anions may be inorganic or organic. Common salt-forming anions (parent acids in parentheses where available) include carbonates ($CO_3^2$) (carbonic acid), chlorides ($Cl^-$) (hydrochloric acid), cyanides ($C\!\!=\!\!N^-$) (hydrocyanic acid), fluorides ($F^-$) (hydrofluoric acid), nitrates ($NO_3^-$) (nitric acid), nitrites ($NO_2^-$) (nitrous acid), phosphates ($PO_4^{3-}$) (phosphoric acid), sulfates ($SO_4^{2-}$) (sulfuric acid), all anions of carboxylic acid (including formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecanoic acid, palmitic acid, margaric acid, stearic acid, nonadecylic acid and andarachidic acid) such as, for example, acetates ($CH_3COO^-$) (acetic acid), citrates (HOC($COO^-$)($CH_2COO^-$)$_2$) (citric acid), oxalates, and stearates. Combinations of salts may be used. Sodium chloride and potassium chloride are preferred.

In an embodiment, stearates may also be preferred as additives. Examples of suitable stearates are calcium stearate, sodium stearate, magnesium stearates, and the like, or combinations thereof may be used.

Examples of sugars include monosaccharides (e.g., glucose, fructose, galactose, and the like), disaccharides (e.g., sucrose, maltose, lactose, or the like), polysaccharides (e.g., callose, laminarin, chrysolaminarin, xylan, arabinoxylan, mannan, fucoidan, galactomannan), or combinations thereof.

Solvents that may be used as additives include the carrier solvent. The additive solvents and/or the carrier solvents exclude the solvents that are used as supercritical solvents and superheated solvents. Solvents added as additives include liquid aprotic polar solvents, polar aprotic solvents, polar protic solvents, non-polar solvents, or combinations thereof.

Examples of liquid aprotic polar solvents such as water, propylene carbonate, ethylene carbonate, butyrolactone, acetonitrile, benzonitrile, nitromethane, nitrobenzene, sulfolane, dimethylformamide, N-methylpyrrolidone, or the like, or combinations comprising thereof. Polar protic solvents such as, but not limited to, water, methanol, acetonitrile, nitromethane, ethanol, propanol, isopropanol, butanol, or the like, or combinations comprising at least one of the foregoing polar protic solvents may be used. Other non-polar solvents such a benzene, toluene, methylene chloride, carbon tetrachloride, hexane, diethyl ether, tetrahydrofuran, or the like, or combinations comprising at least one of the foregoing solvents may also be used. Co-solvents comprising at least one aprotic polar solvent and at least one non-polar solvent may also be utilized to modify the swelling power of the solvent and thereby adjust the rate of crosslinking of the ICP or the ICP precursor. Ionic liquids, which mainly comprise the imidazolium salts, may also be utilized for swelling the polymer.

Gaseous additives may be added if desired. Gaseous additives can include gases that facilitate phase separation, foaming, crosslinking, crystallization, and the like.

The additives may be used in amounts of 0.05 wt % to 30 wt %, preferably 0.1 to 10 wt %, preferably 0.5 to 5 wt % and more preferably 1 to 3 wt %, based on the total weight of the polymer, the superheated fluid or the combination of the superheated and supercritical fluid, and the additive.

It is generally desirable to use polar fluids to treat polar polymers and non-polar fluids to treat non-polar polymers, though combinations of these fluids may be used to treat either polar or non-polar polymers. Conversely, a polar fluid may be used to treat a non-polar polymer that contains a polar dispersed polymeric phase or alternatively, a non-polar fluid may be used to treat a polar polymer that has dispersed in it a non-polar dispersed polymeric phase.

Many liquids like water or alcohol that are normally not suitable process aids or solvents for polymers change their interaction when introduced into the polymer in their superheated state. For example, water at 300° C. and autogenic pressures (i.e., pressures above the critical pressure at 300° C. to keep the liquid from boiling) exhibits a density and polarity similar to that of acetone at room temperature. The dielectric constant of water also drops rapidly as temperature is increased and at 300° C. falls from 80 (at 20° C.) to 20. Therefore, as the water temperature is increased, the solubility of non-polar organic compounds increases much more than expected from simply an increase in temperature.

For example, polyamides can dissolve in superheated water. However, polyamides can also be stable in superheated water for up to 10 minutes at 200° C. These results indicate that superheated water can be used for processing many articles based on polyamides and their composites.

In an exemplary embodiment, a superheated combination of water with small amounts of a second superheated solvent (e.g., alcohols, ketones, including volatile organic solvents) may be used to treat other polymers that are not water soluble per se. In an embodiment, the amount of the first superheated fluid in a superheated fluid blend can be from 1 to 99 weight percent (wt %), preferably 10 to 90 wt %, and preferably 20 to 80 wt %, of the total weight of the combination of fluids in the superheated fluid blend. In another embodiment, the amount of the second superheated fluid in a superheated fluid blend can be from 1 to 99 weight percent (wt %), preferably 10 to 90 wt %, and preferably 20 to 80 wt %, of the total weight of the combination of fluids in the superheated fluid blend. When water is used in a superheated fluid blend, the amount of water in the superheated fluid blend can be from 5 to 100 weight percent (wt %), preferably 10 to 80 wt %, of the total weight of the combination of fluids in the superheated fluid blend.

When a first superheated fluid is used in conjunction with a first supercritical fluid, the amount of the first superheated fluid in the fluid blend can be from 1 to 99 weight percent (wt %), preferably 10 to 90 wt %, and preferably 20 to 80 wt %, of the total weight of the combination of fluids in the fluid blend. In another embodiment, the amount of the first supercritical fluid in the fluid blend can be from 1 to 99 weight percent (wt %), preferably 10 to 90 wt %, and preferably 20 to 80 wt %, of the total weight of the combination of fluids in the fluid blend.

The temperature and the pressure used to swell the polymer is dependent upon the type of polymer and the type of the fluid. When water is used as a superheated fluid it is generally used at a temperature of 100 to 300° C. and a pressure of 1 to 2100 kilograms per square centimeter ($kg/cm^2$). When ethanol is used as a superheated fluid it is generally used at a temperature of 78 to 300° C. and a pressure of 1 to 2100 kilograms per square centimeter ($kg/cm^2$).

In one embodiment, in one method of manufacturing a composition using a superheated fluid or a combination of a superheated fluid with a supercritical fluid, the polymer or blend of polymers is charged to a mastication device. The superheated fluid or a combination of a superheated fluid with a supercritical fluid is charged to the device in their respective states. In short, a superheated fluid is charged to the device in its superheated state and a supercritical fluid is charged to the device in its supercritical state. The polymer is fed to the device simultaneously with the superheated fluid or a combination of the superheated fluid with the supercritical fluid and is mixed in the presence of the fluid. The polymer may be fed to the device in the form of a melt (e.g., at a temperature above it glass transition temperature or above its melting point), a solid (e.g., a powder, pellets, a briquette), a suspension, or in a solution. When fed to the device in the form of a suspension or in the form of a solution, the fluid for forming the suspension or the solution can be chemically the same or different from the supercritical fluid or the superheated fluid. This fluid is referred to as the carrier fluid.

The supercritical fluid and/or the superheated fluid dissolves in the polymer (solubilizes the polymer) to form a single phase. In an embodiment, the supercritical fluid, the superheated fluid, or a mixture of the superheated fluid and the supercritical fluid can solubilize the polymer to form a single phase solution. The pressure and temperature in the mixing device are maintained at values that encourage the fluids to remain in their respective states (i.e., the superheated fluid remains in its superheated state and the supercritical fluid remains in its supercritical state). When the desired degree of mixing is achieved, the pressure and temperature in the mixing device are changed to values that permit phase separation of the fluid from the polymer. In an embodiment, the pressure and the temperature in the mixing device are reduced (from their respective values that render the fluid a superheated fluid or a supercritical fluid) to permit the phase separation of the fluid from the polymer. During the phase separation of the fluid from the polymer, foaming occurs. This phase separation occurs due to "binodal decomposition". When the fluid is removed from the pores of the polymer, a foam is formed. The foams can be closed cell foams or open cell foams.

In an embodiment, by changing the ratio of the supercritical fluid to the superheated fluid, the cell structure of the resulting foam can be changed. In an embodiment, by changing the ratio of supercritical fluid to superheated fluid (when both the superheated fluid and the supercritical fluid are present), the ratio of open cells to closed cells in a foam can be changed. In an embodiment, the volume ratio of open cells to closed cells can range 10:90 to 90:10, specifically 20:80 to 80:20, and more specifically 30:70 to 70:30.

In an embodiment, the time period for which the mixing is conducted is less than that which would cause degradation of the polymer.

Devices in which the mixing is conducted include those where blending of the fluid with the polymer to form a single phase occurs as a result of energy imparted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Blending involving the aforementioned components may be conducted in machines such as single or multiple screw extruders, Buss kneader, Henschel, helicones, Ross mixer, Banbury, roll mills, molding machines such as injection molding machines, vacuum forming machines, blow molding machine, or then like, or combinations comprising at least one of the foregoing machines.

As detailed above, the use of a superheated fluid and a supercritical fluid as the process media produces products having improved properties. In particular, it has been discovered that many polymeric materials that can be processed using superheated fluids can be enhanced when a supercritical fluid is used as a pressurizing media. One advantage of using a combination of a superheated fluid with a supercritical fluid is that the supercritical fluid can further increase the superheated fluid concentration in the polymer and/or also plasticize the polymer further to provide additional process enhancements. Different concentrations of superheated fluids dissolved in supercritical fluids would have an advantage in the specific densities and concentrations available in the mixed phase with the polymer.

The introduction of superheated fluids into a polymer can depress its melting point and allow for processing (flow) of the polymer. The combined addition of both a supercritical fluid and superheated fluid can further synergistically depress the polymer melting point allowing further process enhancements. This can happen with homopolymers listed above as well as copolymers and polymer based composites. In another embodiment of this invention, other additives can be used to interact with the polymer and the superheated fluid and supercritical fluid to enhance the processability of the polymer. This may include the use of surfactant molecules in the case of water or other aqueous superheated fluids or ionic compounds to alter ionic or dielectric characteristics of the polymer, thereby enhancing its processability.

The compositions and the methods disclosed above are exemplified in the following non-limiting examples.

EXAMPLES

Example 1

Figure 1:
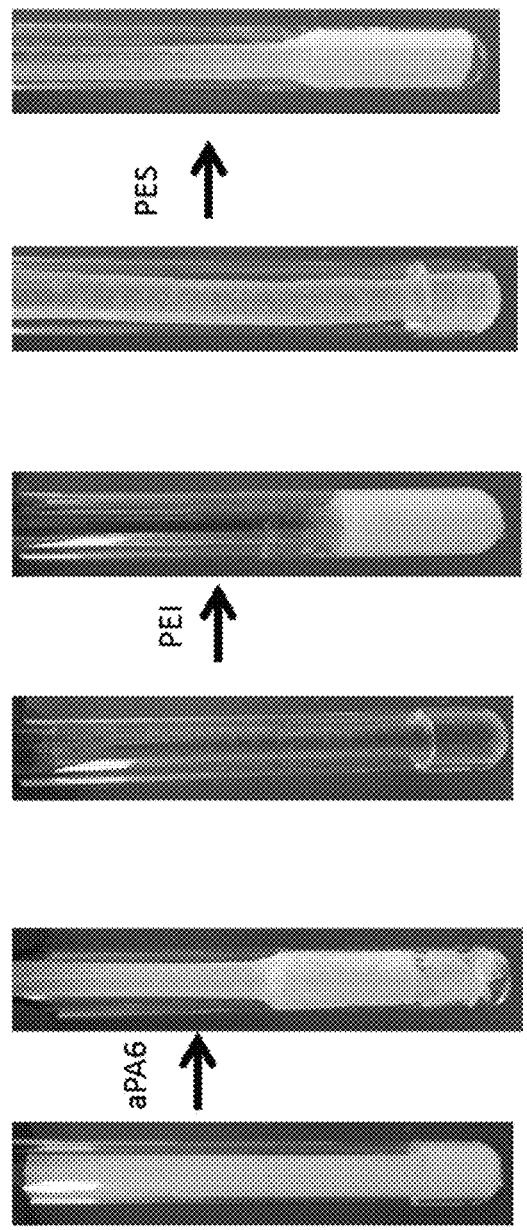
FIG. 1 shows the before and after figures of the polyamide, polyetherimide and polyethersulfone for the Example 1.

This example demonstrates the use of superheated fluids to enhance the processability of polymers, anionically polymerized polyamide 6 (aPA6), polyetherimide (PEI), and polyethersulfone (PEI) were each partially immersed in ethanol, pressurized to 800 pounds per square inch (psi), the temperature raised to 180° C. for 30 minutes and then released. FIG. 1 illustrates pictures of the before and after treatment of solid pieces of each polymer. Note that all three polymers show significant foaming and expansion in the portions that were in the superheated ethanol. Further, in each case this foaming occurred well below the melting point of the polymer as illustrated by the fact that above the liquid line, the polymer remains unaffected.

Example 2

Figure 2:
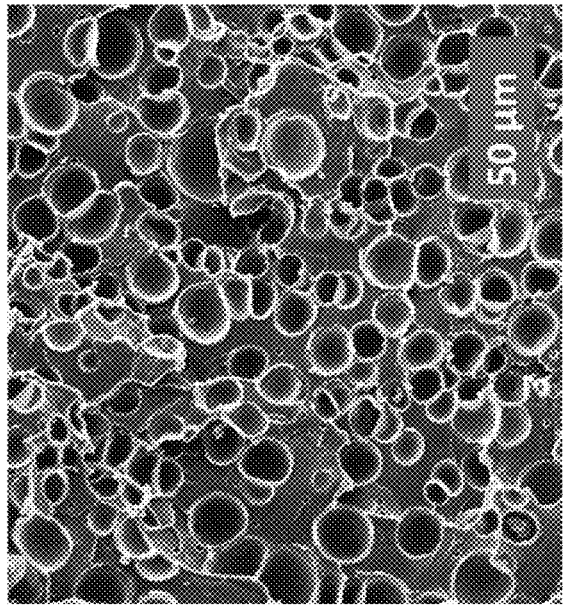
FIG. 2 shows a micrograph that depicts the microstructure of the polyethersulfone from the Example 2.
Figure 2:
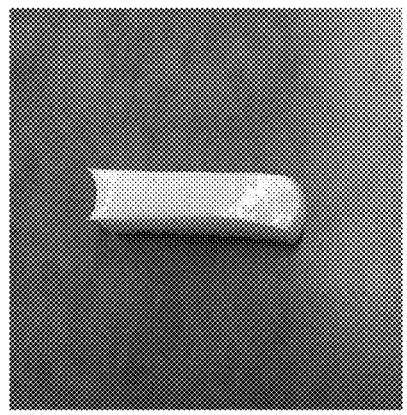

In this example, PES is conditioned in superheated water at 165° C. and foamed. The foam morphology is shown in the FIG. 2 show a 15% foam by density. Note that the melting point (glass transition temperature) for PES is 225° C. Yet in the presence of deionized water, the PES shows evidence that it can be readily processed 60° C. below its melting point under ambient conditions.

Example 3

Figure 3:
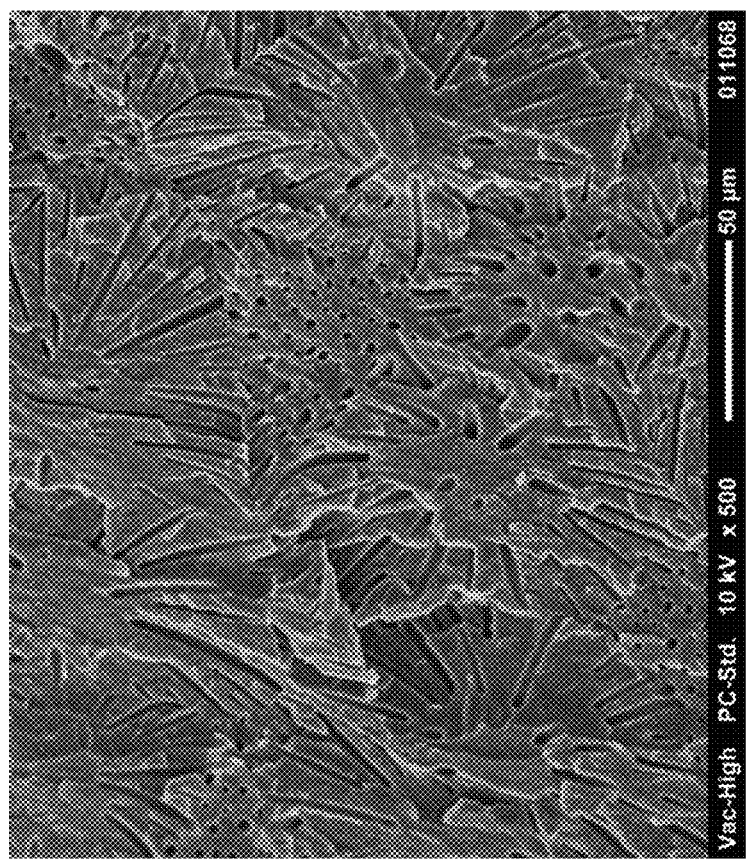
FIG. 3 shows polyamide crystallized from superheated water.

In this example it is demonstrated that unique polyamide 6 (PA6) cellular structures can be made by cooling under isochoric and isobaric conditions. Phase separation of PA6 from water at 3,000 psi and 215° C. was investigated. As can be seen in FIG. 3, cooling the sample under isochoric conditions results in a very unique phase separated structure. Long channel like voids formed radiating out from spherulitic structures in the material. As the temperature lowered crystal spherulites formed in the solution. As these spherulites formed water was forced to phase separate from the material in an ordered fashion such that the structures were templated based upon the location of crystallization.

Example 4

Figure 4:
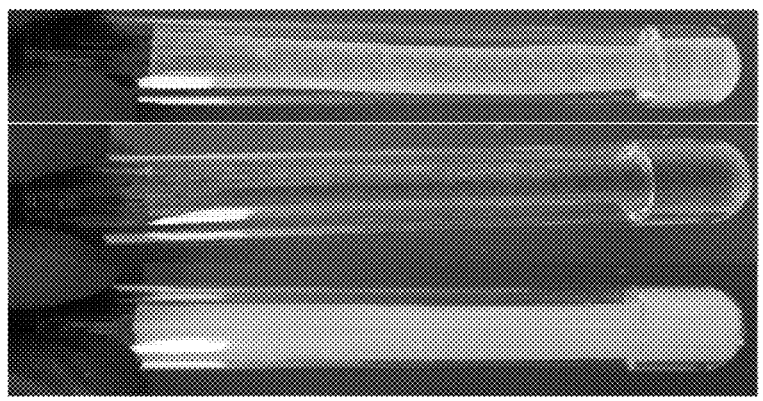
FIG. 4 shows representative samples of aPA6, PEI, and PES partially submerged in ethanol prior to treatment from the Example 4.

In this example, the added benefits of combining potential for superheated fluids to enhance the processability of polymers. Polyamide 6 (PA6), polyetherimide (PEI), and polyether sulfone (PES) were subjected to superheated ethanol at 180° C. Three pressurizing conditions were tested: 800 psi $CO_2$ gas, 3000 psi $CO_2$ supercritical fluid, and 3000 psi argon gas. Samples were partially immersed in ethanol then pressurized with the previously mentioned conditions and heated to 180° C. for a period of 30 minutes. All samples were rapidly depressurized and the reactor was quenched in a water bath to room temperature. FIG. 4 shows the samples immersed in ethanol prior to treatment.

Figure 5:
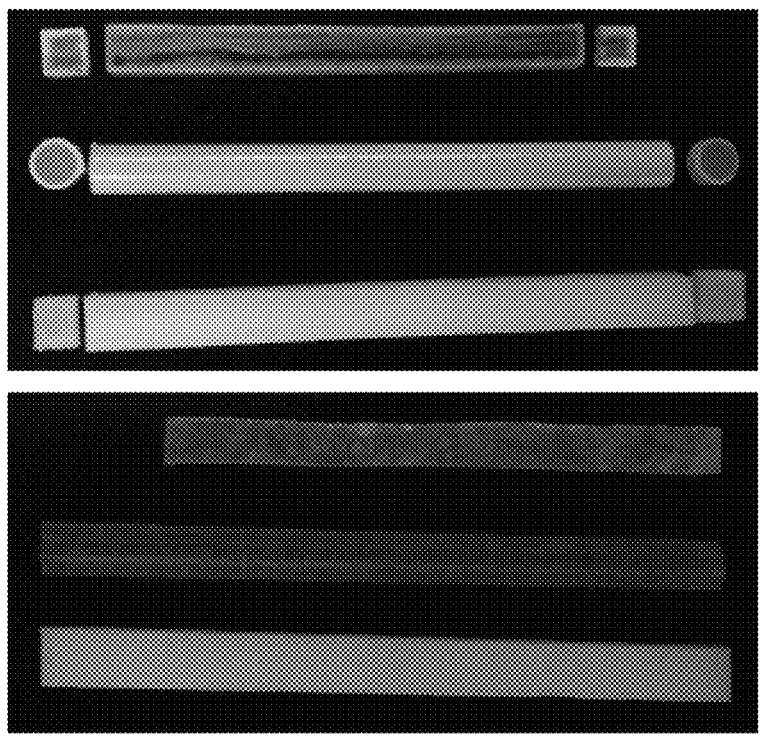
FIG. 5 shows on the left: aPA6, PEI, PES prior to treatment; and on the right: aPA6, PEI, PES treated with 3,000 psi $CO_2$ supercritical fluid and superheated ethanol from the Example 4.

Samples treated with 3000 psi $CO_2$ supercritical fluid and ethanol exhibited a foamed surface coating the sample surface evenly without regard to where ethanol was in contact with it prior to processing. This result shows that superheated ethanol was dissolved in the supercritical $CO_2$ and transported evenly to be absorbed in the sample surface. FIG. 5 shows on the left: aPA6, PEI, PES prior to treatment; and on the right: aPA6, PEI, PES treated with 3,000 psi $CO_2$ supercritical fluid and superheated ethanol.

Figure 6:
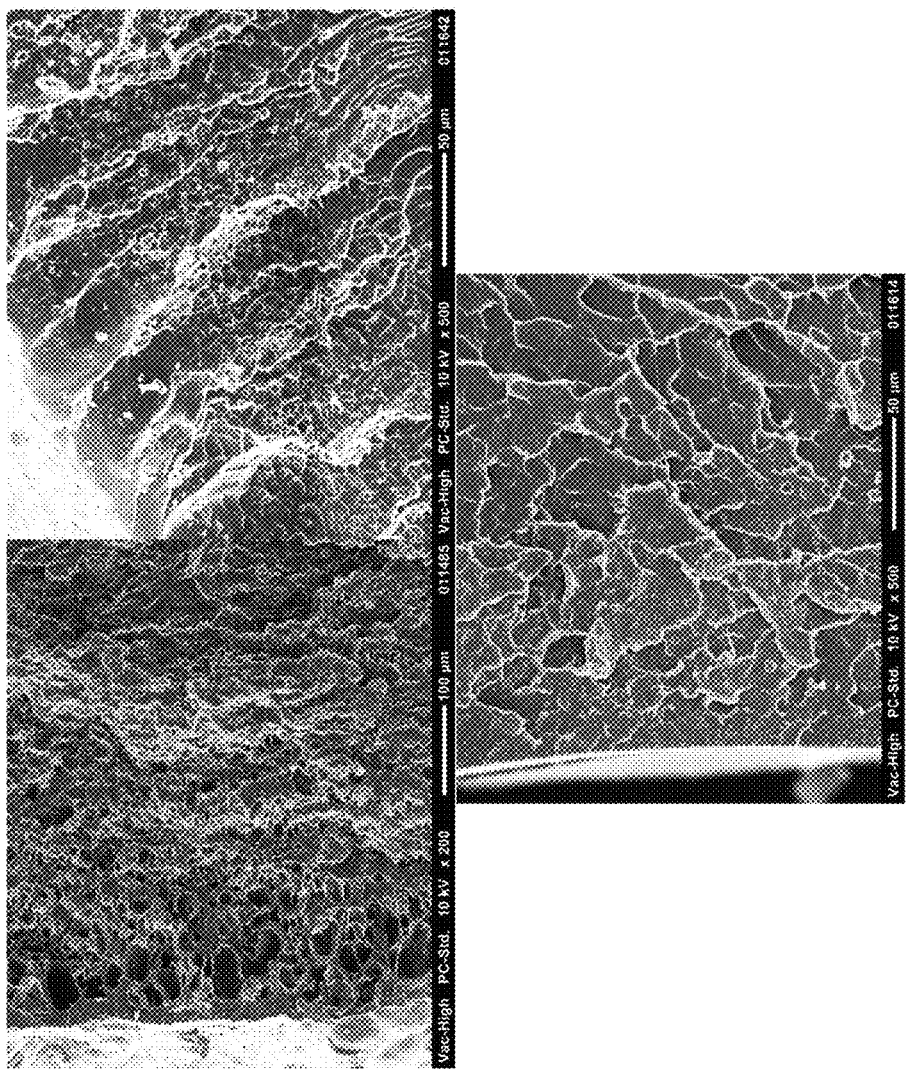
FIG. 6 shows the aPA6, PEI, and PES sample surface cross sections after being treated with supercritical $CO_2$ and superheated ethanol.

Scanning electron microscopy was used to observe these surface cross sections. FIG. 6 depicts scanning electron micrographs-clockwise from top left: aPA6, PEI, PES sample surface cross sections treated with supercritical CO2 and superheated ethanol.

Samples treated with 800 psi $CO_2$ gas and 3000 psi argon gas exhibited a foamed lower portion and an unchanged upper portion. This result shows that superheated ethanol can be absorbed into the polymer samples allowing it to dissolve and foam under these conditions. This result also clearly demonstrates the difference between localized absorption and foaming with superheated ethanol in $CO_2$ gas or argon gas compared to foaming from superheated ethanol dissolved in supercritical $CO_2$.

Figure 7:
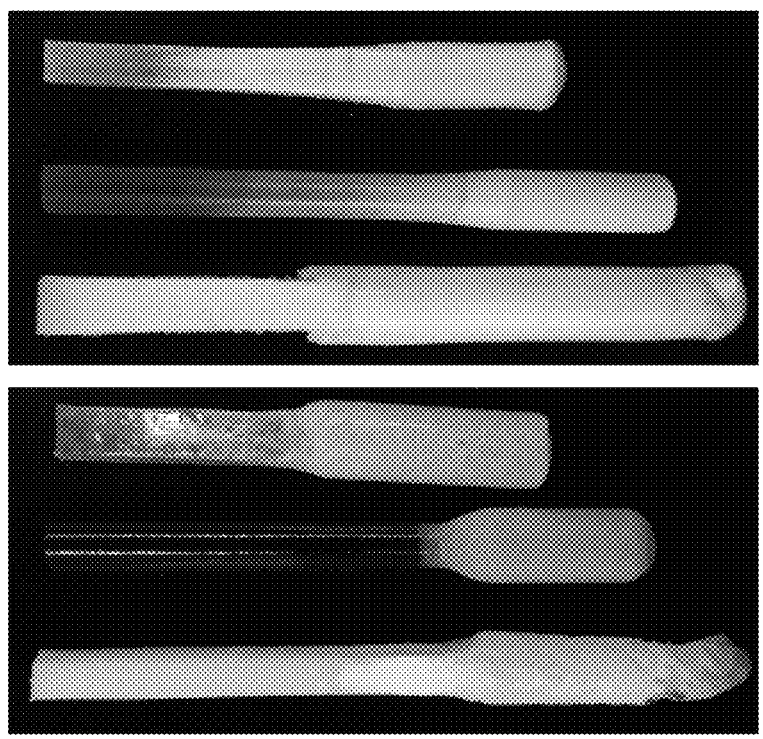
FIG. 7 shows on the left: aPA6, PEI, PES treated with 800 psi $CO_2$ gas and superheated ethanol; and on the right: aPA6, PEI, PES treated with 3,000 psi argon gas and superheated ethanol.

FIG. 7 shows on the left: aPA6, PEI, PES treated with 800 psi $CO_2$ gas and superheated ethanol; and on the right: aPA6, PEI, PES treated with 3,000 psi argon gas and superheated ethanol.

Example 5

This example demonstrates the ability of superheated fluids to reduce melting and glass transition temperatures of polymers. The effect of superheated fluids on polymer melting and glass transition temperatures was identified using scanning differential calorimetry high pressure capsules. In each example, the polymer was encased in the pressure capsule with the liquid to be superheated at atmospheric conditions and then heated while measuring calorimetric data. The superheated liquid self-pressurized at a variable pressure that is dependent on the temperature to maintain superheated characteristics. Melting and glass transition temperatures were observed and compared with samples measured without superheated fluid. The melting and glass transition temperatures are shown in the Table 1 below.

TABLE 1

| Polymer | Transition without fluid (° C.) | Superheating Fluid | Transition with Superheated Fluid (° C.) |
| --- | --- | --- | --- |
| Polyethylene terephthalate | 214 Tm | Ethanol | 195 Tm |
| Polytrimethylene terephthalate | 225 Tm | Butanol | 191 Tm |
| Polybutylene terephthalate | 223 Tm | Butanol | 185 Tm |
| High-density polyethylene | 133 Tm | Butanol | 125 Tm |
| Poly(4-methyl-1-pentene) | 222 Tm | Butanol | 166 Tm |
| Polyvinyl alcohol | 206 Tm | Ethanol | 165 Tm |
| Polyoxymethylene | 158 Tm | Water | 142 Tm |
| Polyethersulfone | 220 Tg | Water | 159 Tg |
| Poly(p-phenylene oxide) | 209 Tg | Butanol | No Tg visible |

From the Table 1 it may be seen that a wide variety of different polymers having different polarities may be treated with superheated fluids and undergo a depression in the melting or the glass transition temperature.

Example 6

Figure 8:
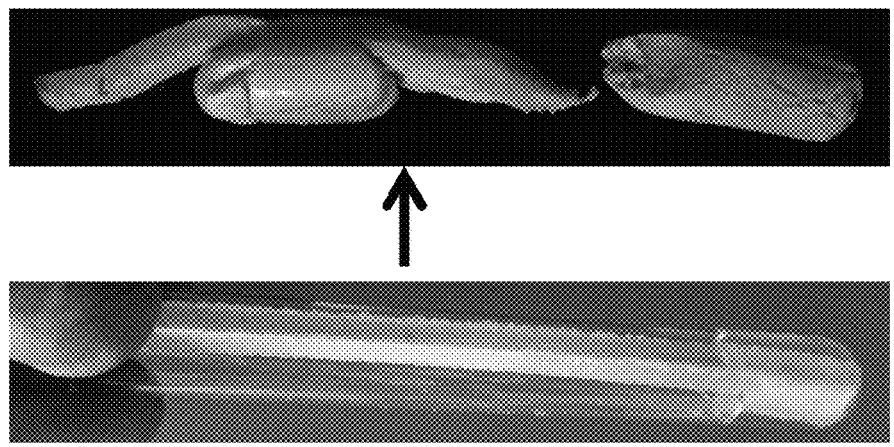
FIG. 8 illustrates pictures of the before and after treatment of solid poly(p-phenylene oxide) with superheated ethanol.

This example demonstrates the use of superheated fluids to enhance the processability of polymer poly(p-phenylene oxide) (PPO). PPO was partially immersed in ethanol, pressurized with 3 kilopounds per square inch (kpsi) argon, the temperature raised to 180° C. for 30 minutes and then released. FIG. 8 illustrates pictures of the before and after treatment of solid PPO. Note that significant foaming and expansion in the portions that were in the superheated ethanol. Further, in each case this foaming occurred well below the glass transition temperature of the polymer as illustrated by the fact that above the liquid line, the polymer remains unaffected.

Example 7

This example demonstrates the ability of polymers to be processed through extrusion in the presence of superheated liquids at low temperatures. Polymers processed through batch extrusion and conditions are listed in Table 2. In the case of poly(p-phenylene oxide) (PPO) melt processing of the homopolymer is not possible even at temperatures above its glass transition temperature. Extrusion of PPO was achieved at 220° C. in the presence of superheated ethanol such that the ethanol decreased the polymer viscosity sufficiently to extrude and foam it.

TABLE 2

| Polymer | Superheated Fluid | Extrusion Temperature (° C.) |
| --- | --- | --- |
| Poly(p-phenylene oxide) | Ethanol | 220 |
| High-density polyethylene | Tetramethylsilane | 120 |
| Polyamide 6 | Ethanol | 180 |
| Polyoxymethylene | Ethanol | 150 |

Example 8

This example demonstrates the effect of supercritical carbon dioxide fluid on polyethersulfone (PES) and the effect of a combination of supercritical carbon dioxide and superheated water on the same polyethersulfone.

Figure 9:
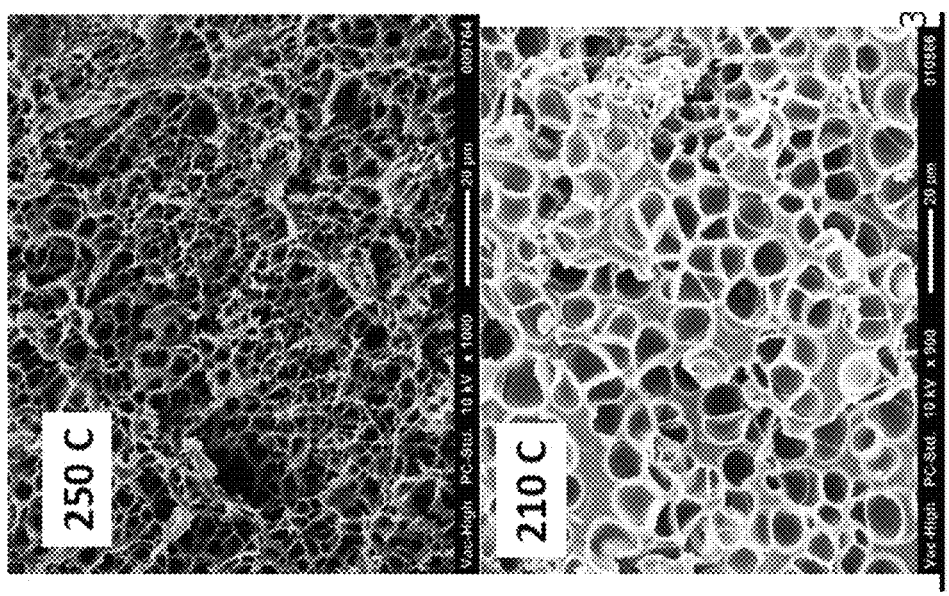
FIG. 9 shows photomicrographs of polyethersulfone foams that were produced by foaming in supercritical carbon dioxide only. The FIG. 9 shows two foams—one produced at 250° C. and the other produced at 210° C.

FIG. 9 shows photomicrographs of polyethersulfone foams that were produced by foaming in supercritical carbon dioxide only. These samples are comparative samples. The FIG. 9 shows two foams—one produced at 250° C. and the other produced at 210° C. Both are closed cell foams and show no measurable permeability. Foam density and cell size were found to be dependent upon foaming temperatures.

Figure 10:
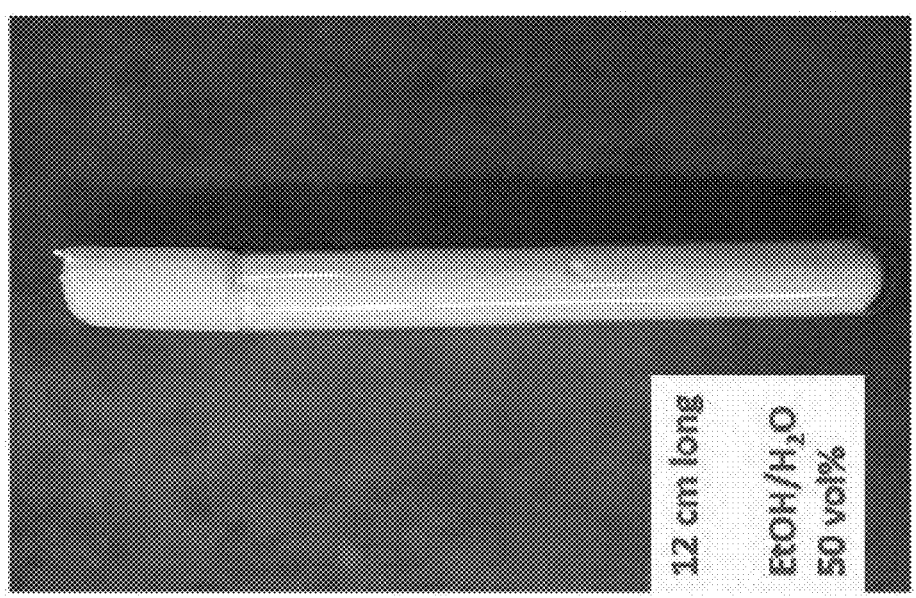
FIG. 10 show photographs of foams that were produced in either superheated ethanol fluid (left) or a superheated fluid combination of ethanol and water (right)
Figure 10:
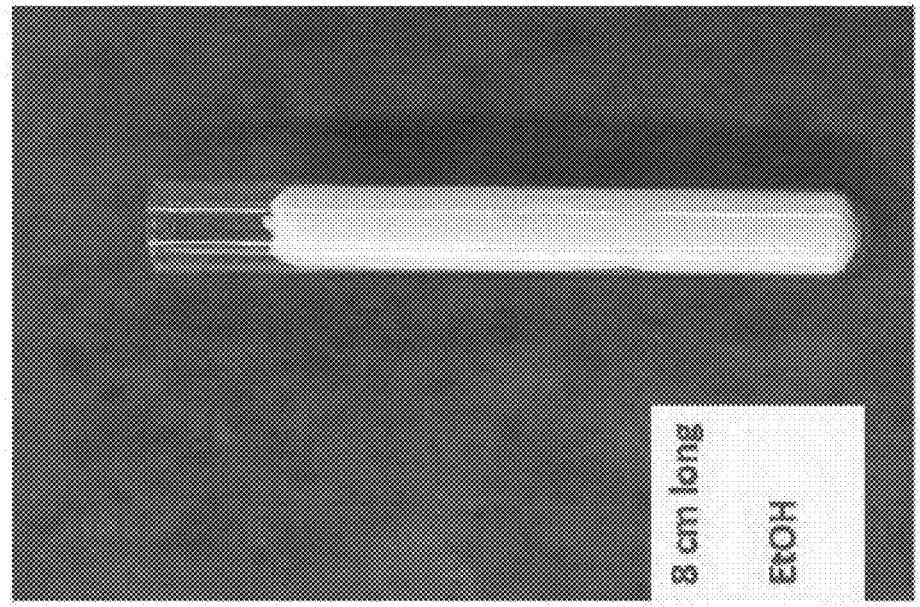

FIG. 10 show photographs of foams that were produced in either superheated ethanol fluid or a superheated fluid combination of ethanol and water. The fluids were used in amounts of 5 milliliters. The polymers were exposed to the fluids at 165° C. and 4000 pounds per square inch. The saturation period for fluid exposure was 4 hours. The micrographs in the FIG. 10 shows the polyethersulfone exposed to only ethanol on the left while the polyethersulfone exposed to the combination of ethanol and water is shown on the right.

FIG. 11 shows a comparison of photomicrographs of polyethersulfone foams manufactured using either supercritical carbon dioxide, combinations of supercritical carbon dioxide and superheated water or combinations of carbon dioxide (gas) and superheated water. The details of the photomicrographs and the conditions at which the foams are produced are as follows: upper left photomicrograph–supercritical carbon dioxide alone, saturation pressure 4000 psi, and foam temperature=210° C.; upper right photomicrograph–supercritical carbon dioxide alone (saturation pressure 4000 psi, and foam temperature=210° C.)+superheated water (40 wt % $H_2O$/PES); lower left photomicrograph–supercritical carbon dioxide alone (saturation pressure 4000 psi, and foam temperature=165° C.)+superheated water (40 wt % $H_2O$/PES); and lower right photomicrograph–carbon dioxide gas (saturation pressure 800 psi, and foam temperature=165° C.)+superheated water (40 wt % $H_2O$/PES). In order to produce the foams, the pressure was gradually reduced from 4000 psi to a lower pressure at the foam temperature.

From the FIG. 11 it can be seen that quantitative data on the polyethersulfone foams generated with supercritical carbon dioxide and superheated water over a range of temperatures. In all cases the saturation conditions were done at supercritical carbon dioxide pressures of 4000 psi, with 40 wt % $H_2O$/PES over the range of temperatures.

The FIG. 12 shows two graphs—one on the left that shows porosity in foams produced over a wide range of temperatures with the additive in the figure on the left being water, while the one on the right shows that the foams produced in supercritical water produce open cell foams with measurable permeability. The graph on the left of the FIG. 12 shows the porosity for two foams—one produced with supercritical carbon dioxide and the other produced with a combination of supercritical carbon dioxide and water. From the graph on the left it can be seen that when water is used as an additive, the porosity is increased appreciably over foams produced with just supercritical carbon dioxide. The graph on the right of the FIG. 12 shows that foams produced with superheated water are very permeable thus indicating that the use of superheated water increases the amount of open cells while reducing the amount of closed cells in foamed polyethersulfones. The flux in the FIG. 12 (right) indicates when a combination of superheated water and supercritical carbon dioxide are used the resulting foam can be changed from a closed cell foam to an open cell foam depending upon the ratio of the supercritical carbon dioxide to the superheated water.

From the photomicrographs in the FIG. 11 and the graphs in the FIG. 12 it may be seen that the addition of superheated water to the supercritical carbon dioxide will change the structure and the resulting porosity of the foam. Closed cell foams are produced when the polymer is foamed in supercritical carbon dioxide whereas when the polymer is foamed with a small amount of water added to the supercritical fluid, the resulting foam began to display open cell features. In short, the ratio of the supercritical fluid to the superheated fluid can be varied to change the structure and the properties of the resulting foam.

In one embodiment, the weight ratio of the supercritical fluid to superheated fluid that can be used in a particular polymer can be 10:90 to 90:10. In another embodiment, the weight ratio of the supercritical fluid to superheated fluid that can be used in a particular polymer can be 20:80 to 80:20. In yet another embodiment, the weight ratio of the supercritical fluid to superheated fluid that can be used in a particular polymer can be 30:70 to 70:30. In yet another embodiment, the weight ratio of the supercritical fluid to superheated fluid that can be used in a particular polymer can be 40:60 to 60:40. In yet another embodiment, the weight ratio of the supercritical fluid to superheated fluid that can be used in a particular polymer can be 45:55 to 55:45.

The volume ratio of open cells to closed cells in the foam can be varied from 5:95 to 95:5, preferably 10:90 to 90:10, preferably 20:80 to 80:20, more preferably 30:70 to 70:30 and more preferably 40:60 to 60:40.

Example 9

This example was conducted to determine the effect of additives on the morphology of the foams. The additives are added to the mixture of the polymer and the respective fluids and admitted to the pressurization device. The additives may be added before, during or after the solubilization of the polymer by the superheated fluid, the supercritical fluid or both the superheated and the supercritical fluid. It is desirable for the additives to be soluble in the superheated fluid and/or the supercritical fluid. The additives may or may not dissolve into the polymer-fluid mixture during processing. The additives may precipitate during the foaming process to produce a different morphology. In an embodiment, the precipitated particles may be extracted from the porous polymer foam by using a solvent that preferentially dissolves the additive after the foam is manufactured.

In another embodiment, the additives may foam separately from the polymer and this foam may be subjected to a different processing mechanism than the polymeric foam. For example, the foam formed from the additive may be extracted from the polymeric foam using a solvent that effects the additive foam but not the polymeric foam.

The additive used in this example was calcium stearate or sodium chloride while the polymer was polyethersulfone.

The FIG. 13 depicts a micrograph of a polyethersulfone foam to which was added calcium stearate in an amount of 10 wt %, based on the total weight of the foam. This foam was generated by first saturating the polyethersulfone with equal weight percents of superheated and supercritical carbon dioxide. The conditioning (saturation) occurred at 180° C., and 4000 psi.

The FIG. 14 depicts a micrograph of a polyethersulfone foam to which was added sodium chloride in an amount of 10 wt %, based on the total weight of the foam. This foam was generated by first saturating the polyethersulfone with equal weight percents of superheated and supercritical carbon dioxide. The conditioning (saturation) occurred at 180° C., and 4000 psi The inset shows craters on the foam surface where the sodium chloride was present.

Example 10

This example was conducted to show that smaller articles having total weights of less than 100 grams per piece, preferably less than 50 grams per piece and preferably less than 10 grams per piece can be foamed by superheated fluids more easily than they can be foamed by supercritical fluids. The FIG. 15 depicts a photomicrograph where the images in the upper and lower left are polyamide fibers foamed in superheated water and supercritical carbon dioxide. The right side of the FIG. 15 have photographs are scanning electron micrographs of a foamed polyethersulfone film. Note in both cases the saturations conditions were foaming temperature=140° C., saturation pressure 2000 psi, 35 wt % H2O/polymer. The polymer is polyethersulfone. In particular superheated water is more effective than supercritical carbon at foaming small amounts of polymers. Combinations of superheated water and supercritical carbon dioxide may also be used to manufacture foams from small polymeric articles as outlined above.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A composition comprising:
   a polymer; and
   a superheated fluid and a supercritical fluid; where the polymer and the superheated fluid co-exist in a single phase; where the superheated fluid comprises water, alcohol, glycol ether, methane, propane, or a combination thereof; where the supercritical fluid is carbon dioxide.

2. The composition of claim 1, where the polymer that co-exists in the single phase with the superheated fluid has a depressed glass transition temperature.

3. The composition of claim 1, where the polymer and the superheated fluid that co-exist in a single phase do so under pressure greater than atmospheric pressure.

4. The composition of claim 1, where the polymer is a thermoplastic polymer, a thermosetting polymer, a blend of thermoplastic polymers, a blend of thermosetting polymers, and a blend of thermoplastic polymers with thermosetting polymers.

5. The composition of claim 1, where the polymer is a homopolymer, a copolymer, a block copolymer, an alternating copolymer, an alternating block copolymer, a random copolymer, a random block copolymer, a graft copolymer, a star block copolymer, an ionomer, a dendrimer, or a combination comprising at least one of the foregoing polymers.

6. The composition of claim 4, where the thermoplastic polymer is a polyacetal, a polyolefin, a polyacrylic, a polycarbonate, a polystyrene, a polyester, a polyamide, a polyamideimide, a polyarylate, a polyarylsulfone, a polyethersulfone, a polyphenylene sulfide, a polyvinyl chloride, a polysulfone, a polyimide, a polyetherimide, a polytetrafluoroethylene, a polyetherketone, a polyether etherketone, a polyether ketone ketone, a polybenzoxazole, a polyphthalide, a polyacetal, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfonamide, a polyurea, a polyphosphazene, a polysilazane, a fluorinated ethylene propylene, a perfluoroalkoxyethylene, a polychlorotrifluoroethylene, a polyvinylidene fluoride, a polysiloxane, or a combination comprising at least one of the foregoing organic polymers.

7. The composition of claim 1, where the composition further comprises a surfactant, an ionic compound, compatibilizers, copolymers for compatibilization, additive(s) that reduce, eliminate, or mitigate polymer degradation, or a combination thereof.

8. A method comprising:
   exposing a polymer to a superheated fluid and a supercritical fluid;
   swelling at least a portion of the polymer with the superheated fluid so that the polymer and the superheated fluid co-exist in a single phase; where the superheated fluid comprises water, alcohol, glycol ether, methane, propane, or a combination thereof, and where the supercritical fluid is carbon dioxide; and
   changing pressure or temperature within the single phase to change a property in the polymer.

9. The method of claim 8, where the exposing is conducted in the presence of a surfactant and/or an ionic compound.

10. The method of claim 8, where the exposing is conducted in the presence of a surfactant and/or an ionic compound.

11. The method of claim 8, where the changing the pressure or temperature includes reducing the pressure or the temperature.

12. The method of claim 8, where the property is density.

13. The method of claim 8, where the property is crystallinity.

* * * * *